United States Patent [19]

Barratt

[11] Patent Number: 4,632,425

[45] Date of Patent: Dec. 30, 1986

[54] PASSENGER RESTRAINT SYSTEM

[76] Inventor: Mary A. Barratt, 25300 S. Schoenborn Rd., Mulino, Oreg. 97042

[21] Appl. No.: 752,641

[22] Filed: Jul. 8, 1985

[51] Int. Cl.[4] ............................................. B60R 22/00
[52] U.S. Cl. .................................... 280/801; 280/290; 280/808; 297/465; 297/485
[58] Field of Search ....................... 280/290, 801, 808; 297/465, 485, 255

[56] References Cited

U.S. PATENT DOCUMENTS

| | | | |
|---|---|---|---|
| 2,707,988 | 5/1955 | Shaub et al. | 297/255 |
| 2,908,324 | 10/1959 | Muller et al. | 297/465 |
| 3,136,581 | 6/1964 | Caballero | 297/465 |
| 3,524,679 | 8/1970 | De Lavenne | 297/465 |
| 4,226,474 | 10/1980 | Rupert et al. | 297/465 |
| 4,235,474 | 11/1980 | Rosenberg | 297/485 |
| 4,488,691 | 12/1984 | Lorch | 280/801 |

Primary Examiner—John J. Love
Assistant Examiner—Kenneth R. Rice
Attorney, Agent, or Firm—James D. Givnan, Jr.

[57] ABSTRACT

A seat back envelope of heavy duty fabric overlies a seat back in a snug manner and has webbing segments thereon which extend below the seat back for anchoring to a seat frame or vehicle floor. Additional webbing on the envelope is equipped with various closures enabling the webbing to transfer passenger exerted loads to the seat structure. A garment is provided which includes fittings attachable to envelope attached fittings. A restraint vest is also disclosed in combination with a seat back envelope.

12 Claims, 5 Drawing Figures

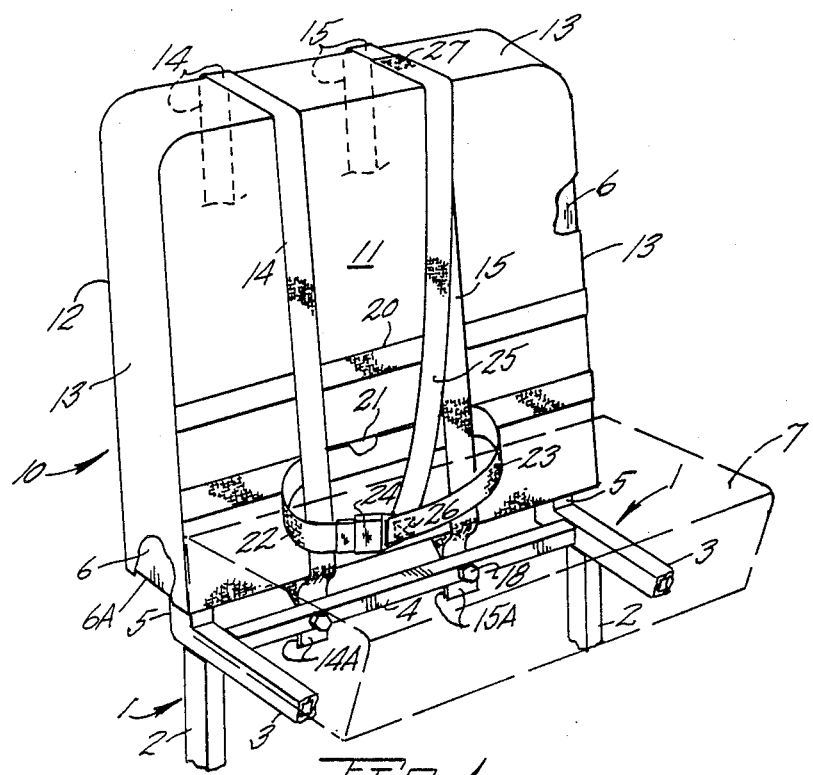
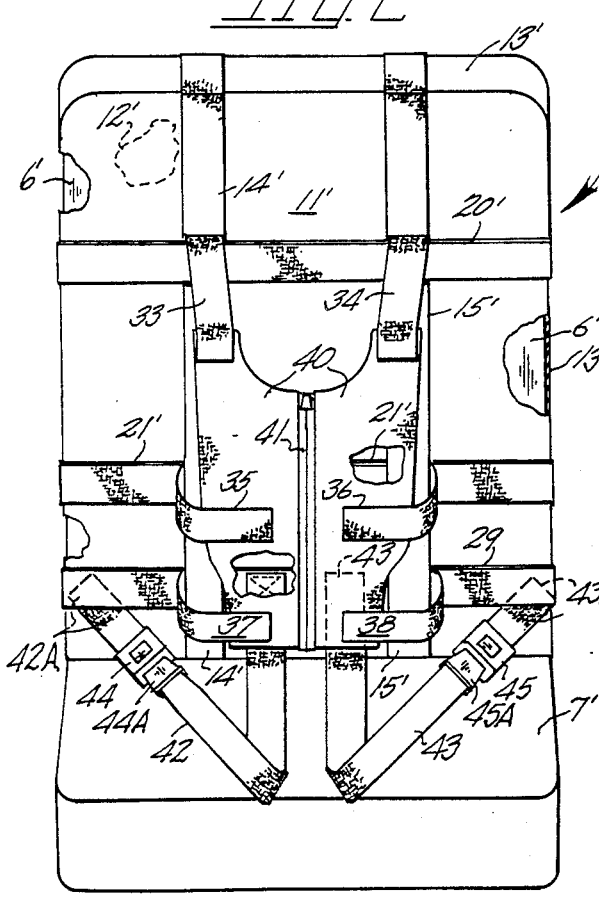
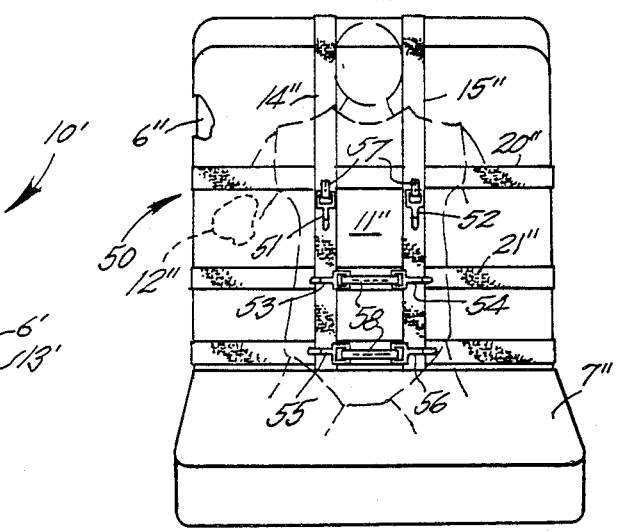
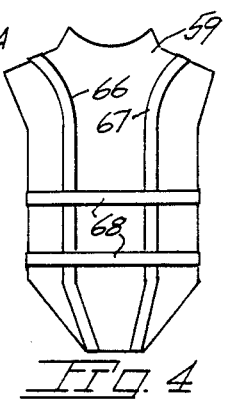
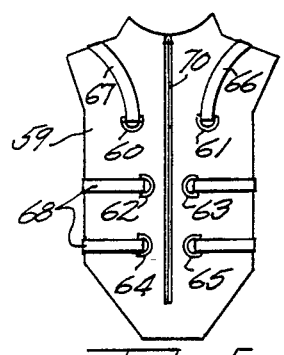

PASSENGER RESTRAINT SYSTEM

BACKGROUND OF THE INVENTION

The present invention concerns a restraint system for vehicle passengers for incorporation into a vehicle with little or no modification of same.

Seat belt use in passenger vehicles, such as school busses, has not been adopted for several reasons one of which perhaps being the cost incurred by a school district in retrofitting same. An additional drawback to the equipping of school busses with seat belts is the problem resulting from several lengthy, loose belt segments being in disarray resulting in improper buckling of said segments.

In those school districts where seat belts are not mandatory it has been found desirable to use same during the transportation of children experiencing physical or emotional problems. Presently, under current state and federal requirements, school districts are obligated to provide transportation to such children. Without restraint of certain of these children, the school district must bear the cost of separate transportation for them. As school districts are typically under tight budgets, it is highly desirable that such children be transported on those busses used for the transportation of the other children.

Any passenger restraint system utilized for students must necessarily be uncomplicated to permit convenient use even by younger students. The present invention includes a restraint system which restrains students who are impaired, either emotionally or physically, in place until released by another party.

U.S. Pat. No. 3,827,716 discloses a vest in combination with seat attached straps; U.S. Pat. No. 2,707,988 discloses an infant sack having a pocket for placement over the upper end of a stroller frame; U.S. Pat. No. 4,097,086 shows a hood for placement over the upper portion of a seat back to support a pillow; U.S. Pat. No. 3,827,752 discloses an impact absorbing panel for attachment to a school bus seat frame; U.S. Pat. No. 4,188,065 shows an infant car seat with a pocket for placement over an end of the seat.

SUMMARY OF THE PRESENT INVENTION

The present invention is embodied within a restraint system particularly suited, but not restrictively so, to use within a school bus.

The present restraint system includes a fabric envelope for fitted placement over a seat back in a snug manner. On the envelope is webbing of the type used in seat belts. The webbing is stitched about the envelope for purposes of strength. Additional webbing carried by the envelope terminates downwardly for securement to a seat frame. Typically seat frames in school busses are adpated to receive belt anchoring means or alternatively may be inexpensively modified to do so. The envelope is of heavy duty construction which, when reenforced by the attached webbing, is capable of transferring passenger exerted loads to the seat back in the event of an accident. Various webbing, belt and garment arrangements are provided within the present restraint system to best suit the particular needs of a school district or other bus operating entity. The present restraint system is also applicable to use on wheel chairs for patient restraint.

Important objectives of the present restraint system include the provision of a system particularly suited for use in retrofitting of existing vehicles in an economical manner and satisfying applicable passenger restraint requirements; the provision of a passenger restraint system which may be utilized for the transport of children requiring special attention by reason of a physical or an emotional impairment; the provision of a passenger restraint system utilizing a seat back envelope with webbing stitched to envelope panels and which transfer passenger exerted loads to the rigid seat back and frame; the provision of a passsenger restraint system for busses and the like that maintains the several seat belts in orderly fashion facilitating proper use by passengers regardless of age; the provision of a restraint system for use with wheel chairs.

BRIEF DESCRIPTION OF THE DRAWING

In the drawings:

FIG. 1 is a perspective view of the present restraint system in place on a vehicle seat part of which is shown in phantom lines;

FIG. 2 is a frontal perspective view of a modified restraint system on a vehicle seat structure;

FIG. 3 is a frontal perspective view of still another form of the present restraint system; and FIGS. 4 and 5 are front and rear elevational views of a garment of a modified restraint system.

DETAILED DESCRIPTION OF THE PREFERRED EMBODIMENTS

With continuing attention to the drawings wherein applied reference numerals indicate like parts in the following description, the reference numeral 1 indicates generally a floor mounted seat frame segment having legs 2 terminating in securement to a floor (not shown), side rails 3 and a seat frame cross member 4 all typically of welded, tube construction. Upright frame members at 5 constitute part of a seat back 6. A seat at 7 is shown in phantom lines. The foregoing structure is intended to be typical of seat structure found on vehicles such as busses. The term vehicles presently encompasses wheel chairs.

The present restraint system includes a seat back envelope indicated generally at 10 having a front panel 11 for placement over the forward surface of the seat back. A rear panel 12 of the envelope similarly snugly overlies the back surface of the seat back. An intermediate panel 13 covers the sides and top of the seat back. The foregoing panels are of a size to effect a snug fit of the envelope over the seat back with the lower extremities of the panels being adjacent with the lower extremity 6A of the seat back. Fabric backed vinyl (heavy duty) has been found suitable for envelope construction. Accordingly, the envelope may be readily applied to or removed from a seat back.

Vertical webbing runs or components at 14 and 15 extend downwardly along the front and rear panels and are suitably stitched thereto and to intermediate panel 13. Webbing segments 14A–15A extend below the panels for securement by fastener assemblies 18 to seat frame cross member 4. Alternatively, the depending webbing segments 14A–15A may be anchored to the vehicle floor if the seat frame does not include a suitable cross member. Still further, segments 14A–15A may be secured to the frame of a wheel chair.

Horizontal webbing runs or components as at 20 and 21 are superimposed on the envelope front panel and are also suitably secured thereto by stitching.

Additional webbing attached to the envelope includes what are presently termed free segments at 22–23 for belt-like passage about the passenger's lower torso with buckle means therefor at 24. Said additional webbing may include a free segment at 25 constituting a shoulder harness with its ends secured at 26 to segment 23 and at 27 to webbing run 15. The vertical webbing runs 14 and 15 overlie free segments 22–23 for reinforcement of same against passenger exerted loads.

In FIG. 2, a modified restraint system is in place on a vehicle seat structure which includes a seat back at 6', a seat at 7' with a seat frame not shown but understood to be similar to the typical seat earlier described. A seat back envelope is indicated generally at 10' having a front panel 11' and a rear panel 12' with the latter adapted to closely overlie the rear surface of the seat back. An intermediate panel 13' extends over the seat back sides and top, all in similarity to the first described seat back envelope.

Vertical webbing runs or components at 14' and 15' pass downwardly along the front and rear panels and are suitably stitched thereto. Webbing segments (not shown) extend below the horizontal seat at 7' for securement to a seat frame cross member or to floor mounted anchoring means as noted in the first form of the invention.

Horizontal webbing runs or components at 20' and 21' extend across the envelope front panel and are secured thereto as by stitching. An additional webbing run at 29 is stitched crosswise to front panel 11'.

Free webbing segments at 33 and 34 are stitched to the front panel in a sandwiched manner between the horizontal and vertical panel attached webbing runs as are additional pairs of free webbing segments at 35–36 and 37–38. Body restraint means shown as a vest 40 is attached to the ends of the free webbing segments 33–34, 35–36 and 37–38. For the sake of convenience, buckles may be provided on each free webbing segment to permit the wearer to adjust the length of the same so as to cause the vest 40 to snugly overlie the upper frontal torso. A zipper closure at 41 permits the passenger to conveniently don and remove the vest.

Leg straps 42 and 43 are both stitched at their rearward ends to front panel 11' of the seat back envelope, and thence extend forwardly over seat 7' for reversal outwardly about the wearer's thighs. Buckle assemblies at 44 and 45 receive an insertable component 44A–45A with the remaining portion of the buckles each being carried by a short segment of leg strap 42A–43A stitched to the seat envelope front panel.

In FIG. 3 a still further form of the present invention is illustrated wherein a seat back envelope indicated generally at 50 is equipped with fittings which cooperate with additional fittings on a later described garment to retain the wearer in place on a seat 7". In similarity to the earlier described seat back envelope, the same overlies a seat back structure 6" which terminates downwardly adjacent the rearward edge of the horizontal seat 7". It is to be understood that the seat back 6" and seat 7" are supported by a seat frame having tubular components such as those shown in FIG. 1 which, as aforesaid, is intended to be more or less typical of vehicle seat structure. Vertical webbing runs 14" and 15" are stitched along front and rear envelope panels 11" and 12". While horizontal webbing runs at 20" and 21" are stitched crosswise of the envelope front panel. As earlier, the vertical webbing runs or component 14"–15" are adapted at their lower most ends for securement to a seat frame component or alternatively for anchoring to the vehicle floor.

In place on the panel attached runs of webbing are pairs of fittings 51–52, 53–54 and 55–56, all shown as hook type snaps having a leaf spring serving to close the bite area of the snap. Said fittings may be consequently attached to the webbing by stitched fabric strips as at 57 and 58.

A garment 59 is shown in FIGS. 4 and 5 for wear about the passengers. Pairs of rings at 60–61 in place on the back of the garment cooperate with snaps 51–52. Similarly paired rings 62–63 on the garment cooperate with snaps 53–54 and 55–56 to removably attach the garment to the seat back envelope. The foregoing rings are mounted to the free ends of garment attached reinforcing straps with said free ends being of a length to facilitate convenient engagement of the snaps and rings of a worn garment. Bands 66, 67 and 68 are stitched to the garment to carry the rings. A zipper closure is at 70.

In use the present restraint system enables the retrofitting of vehicles in a practical manner while providing passenger restraint to an extent believed equivalent to original equipment systems. Further, the present system enables the vehicle operator to equip a portion of the vehicles seats with a restraint system enabling the transport of special children who would otherwise require transport in a second vehicle at considerable cost to the school district.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is hereby claimed:

1. A passenger restraint system for a vehicle attachable to the seat back of the vehicle seat structure, said system comprising,
   a seat back envelope having front and rear panels for snug overlying engagement with the seat back and having a lower edge for positioning adjacent the lower terminus of the seat back, and
   webbing stitched to said seat back envelope and including free webbing segments, body restraint means carried by said free webbing segments and equipped with closure means for positioning of the restraint means about the passenger.

2. The restraint system claimed in claim 1 wherein said webbing includes horizontal and vertical components, said vertical components having runs for passage extending beyond the lower edge of the seat back envelope and thereat adapted for permanent securement to the vehicle.

3. The restraint system claimed in claim 2 additionally including a shoulder harness webbing segment having an upper end attached to said seat envelope, said shoulder harness webbing segment adapted at its remaining end for securement to one of said free webbing segments.

4. The restraint system claimed in claim 1 wherein said panels terminate downwardly adjacent the lower terminus of the seat back.

5. The restraint system claimed in claim 4 wherein said body restraint means includes a garment.

6. The restraint system claimed in claim 5 wherein said garment is adapted to cover the passenger's torso and is equipped with ring type fittings in place on the rearward side of the garment, cooperating fittings carried by said webbing for attachment to the garment fittings securing a passenger wearing same in place.

7. The restraint system claimed in claim 5 wherein said garment is in the nature of a vest.

8. A passenger restraint system for a seat equipped vehicle, said system comprising, a fabric envelope for placement over a vehicle seat back in a fitted manner, webbing stitched to said envelope and extending downwardly therefrom for attachment to the vehicle, a garment for wear by the passenger, and cooperating fittings on said garment and said envelope to confine a garment wearing passenger in place on the vehicle seat.

9. A passenger restraint system for use on a vehicle seat, said system comprising, a fabric envelope for placement over a vehicle seat back to substantially enclose same in a fitted manner, webbing stitched to said envelope and extending downwardly therefrom for permanent attachment to the vehicle, additional webbing stitched to said envelope and having unstitched free segments, and closure means carried by said unstitched free segments and adapted to fit about a passenger to restrain same in place on the vehicle seat.

10. The restraint system claimed in claim 9 wherein said additional webbing constitutes a seat belt and a shoulder harness, said closure means being embodied in a buckle.

11. The restraint system claimed in claim 9 wherein said closure means includes a vest-like garment.

12. The restraint system claimed in claim 9 wherein said closure means includes a garment for wear about the passenger's torso.

* * * * *